United States Patent [19]

Barge

[11] 4,328,451
[45] May 4, 1982

[54] DEVICE FOR CONTROLLING THE ELECTRIC DRIVE MOTOR OF A WINDOW RAISER IN PARTICULAR IN AN AUTOMOBILE VEHICLE

[75] Inventor: Jean A. Barge, Montbeliard, France

[73] Assignee: Aciers et Outillage Peugeot, Audincourt, France

[21] Appl. No.: 163,236

[22] Filed: Jun. 25, 1980

[30] Foreign Application Priority Data

Jun. 28, 1979 [FR] France .................... 79 16694

[51] Int. Cl.³ .................................. G05B 11/18
[52] U.S. Cl. .................................... 318/596; 318/599; 318/663; 318/667; 318/684; 318/265; 318/266; 318/267; 318/466; 318/469; 318/470; 49/28; 49/31
[58] Field of Search ............... 318/596, 599, 663, 667, 318/341, 684, 265, 266, 267, 466, 467, 468, 469, 470; 49/28, 31, 349

[56] References Cited

U.S. PATENT DOCUMENTS 2,640,958  6/1953  Davis ........................... 318/470
3,624,473  11/1971  Robbins ........................ 318/466
3,743,912  7/1973  Mashimo ...................... 318/663
4,072,268  2/1978  Perris ........................... 318/596

FOREIGN PATENT DOCUMENTS 2305731  8/1974  Fed. Rep. of Germany ...... 318/466

Primary Examiner—J. V. Truhe
Assistant Examiner—Eugene S. Indyk
Attorney, Agent, or Firm—Sughrue, Mion, Zinn, Macpeak and Seas

[57] ABSTRACT

The device comprises for each window an electric driving motor and a selector which is adapted to ensure the selective supply of current to the motor, in one direction or the other, through a control circuit acting on a supply source. The supply source is of the type capable of delivering at least two distinct energy levels. The control circuit comprises means for applying to an input of the supply source an energy level control signal which produces, as a function of the position of the selector, the application of a torque to the motor when raising the window which is higher than the torque applied when descending the window.

22 Claims, 5 Drawing Figures

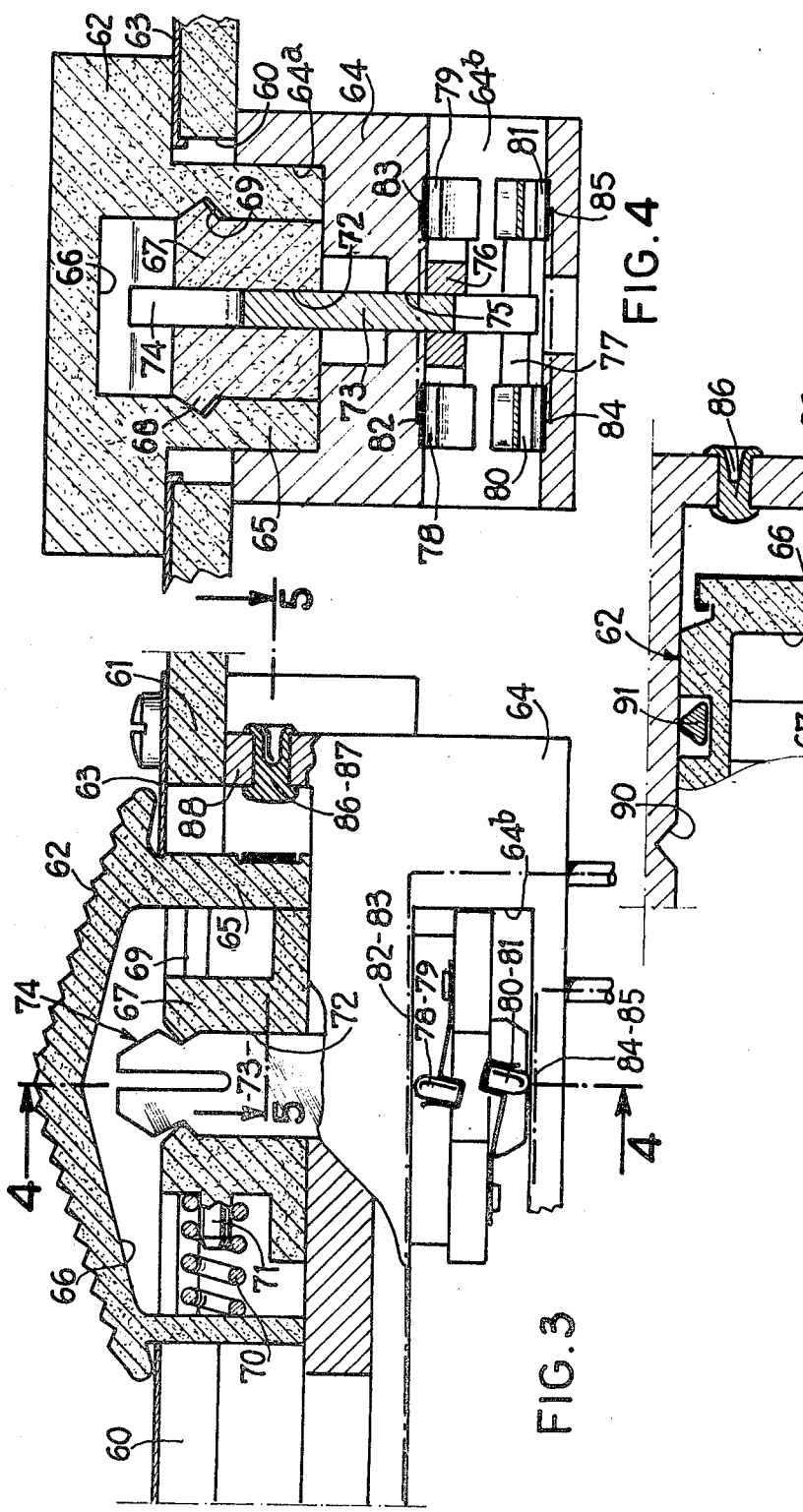

DEVICE FOR CONTROLLING THE ELECTRIC DRIVE MOTOR OF A WINDOW RAISER IN PARTICULAR IN AN AUTOMOBILE VEHICLE

The present invention relates to window raisers controlled electrically for in particular automobile vehicles.

When a vehicle window is controlled electrically, the raising and descending forces that the driving motor must provide are not the same since, when descending, the weight of the window is added to the torque of the motor whose electromechanical characteristics, and consequently the torque, are identical irrespective of the direction of rotation.

In order to avoid this drawback, it is known to employ compensating springs which, in restoring the energy when the window rises and in storing the energy when the window descends, reduces the difference between the speeds of displacement. However, these springs increase the cost and overall size of the window control mechanisms.

Further, it is known from French Pat. No. 1 556 599 to control the window raising motor in such manner that it furnishes, itself, two distinct torques for raising and descending the window. However, the circuit described in this patent employs a motor having three brushes and provides a torque for raising the window which is less than that applied for the descent. Consequently, this circuit in no way enables the compensating springs to be dispensed with in the window raising mechanism.

An object of the invention is to provide an electric control device for raising windows which is devoid of compensating springs and yet ensures a constant speed of displacement of the window during the rising and descending movements.

According to the invention, there is provided an electric control device controlling window raisers for in particular automobile vehicles comprising, for each window to be controlled, an electric driving motor and a selector which is adapted to ensure the selected supply of power to the motor in one direction or the other through a control circuit which acts on a supply source, wherein said supply source is of the type capable of furnishing at least two distinct energy levels and comprises for this purpose a control input and said control circuit comprises means for applying to said input a signal controlling the energy level which results, as a function of the position of the selector, in the application of a torque to the electric motor when raising the window which is higher than that applied for the descent.

Owing to these features, it is consequently possible to simplify the window raising mechanism and this results in a saving in material and labour when assembling.

According to an advantageous feature of the invention, said supply source comprises a current chopper having a variable duty cycle and a power circuit connected between the chopper and said motor so as to deliver to the motor energy with the duty cycle imposed by the current chopper.

Such a current chopper has the advantage of requiring only very low energy for placing the motor into either operational mode.

According to another feature, when the window rises, said power circuit delivers to the motor a dc current since it is controlled by a continuous signal by said chopper (duty cycle 100%) whereas, when the window descends, said chopper imposes on said power circuit a signal having a given duty cycle.

Further features of the invention will be apparent from the ensuing description which is given merely by way of example with reference to the drawings in which:

FIG. 3 is a sectional view of a position selector which enables a user to initiate the movements of a window;

FIG. 4 is a sectional view taken on line 4—4 of FIG. 3, and,

FIG. 5 is a sectional view taken on line 5—5 of FIG. 3.

FIG. 1 shows a simplified diagram of the preferred embodiment of the control device according to the invention.

Figure 1:
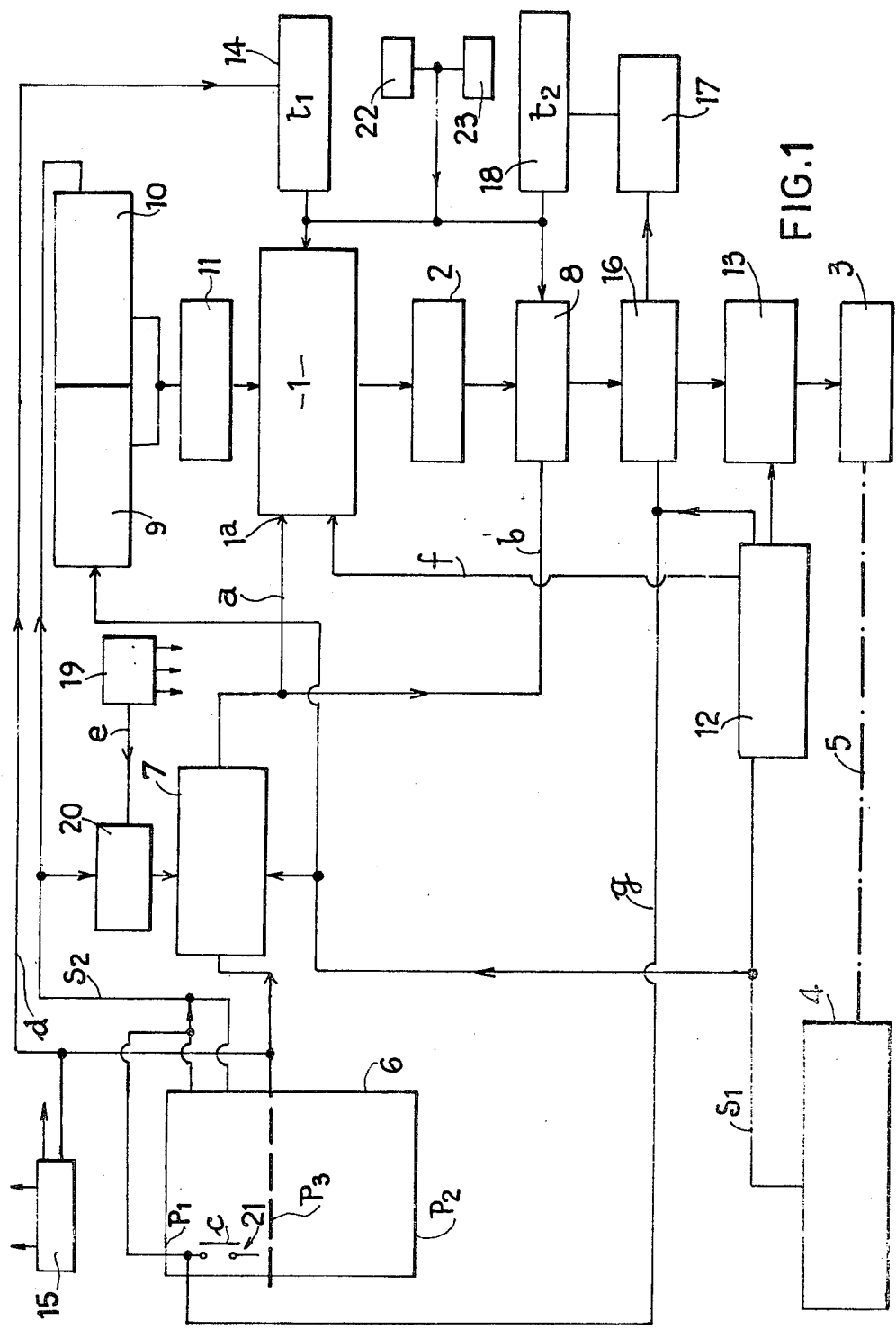
FIG. 1 is a block diagram of a window raising control device according to a preferred embodiment of the invention.

Only the functions and their logical connections have been shown, it being understood that this device takes its electric energy from a network supplied with current by the battery of the vehicle.

Further, only the circuits of a single window raiser have been shown for reasons of simplicity.

The control device comprises a supply source including a chopper circuit 1 connected to a power circuit 2 which delivers to a motor 3 a current whose duty cycle is variable as a function of a selection signal which is applied to an input 1a of the chopper 1, which signal determines the operation of the latter. In the illustrated case, the chopper may impose on the power circuit 2 two distinct energy levels, one corresponding to a dc current at the full voltage of the battery of the vehicle and the other determined by a predetermined duty cycle produced in the chopper 1, so that the energy level supplied when the window rises is higher than that supplied for the descent of the window.

The motor 3 is a conventional dc current motor employed in conventional electrical window raisers and is dimensioned to deliver the required rising speed as a function of the passive resistances due in particular to the weight and the inertias of the window and moving parts, the forces opposing the movement coming from the window sealing elements, internal mechanical friction in the control mechanism, etc..

The energy level required for the descent of the window is lower than that required for raising the window and may be represented as a certain percentage of the latter.

For the descent, the chopper 1 intervenes in such manner that its duty cycle is equal to the percentage of the level delivered for raising the window, the duty cycle $\delta\%$ being the ratio $\delta\% = (t\, o\, n \times 100)/T$ in which $t\, o\, n$ is the time of non-conduction and $T$ the chopping period.

The chopping period $T$ is preferably chosen to be rather short so as to avoid the emission of unpleasant noise from the motor 3. This frequency is close to inaudible frequencies while remaining rather low so as to avoid in the power circuit 2 excessive energy losses resulting from switching phenomena and reduce the number of accessory for aiding the switching. A suitable value of the chopping frequency is for example 20 kHz.

The device also comprises a window position detector 4 which delivers a signal $S_1$ corresponding to the real position of the window.

This window position detector 4 preferably comprises a circular potentiometer whose angular orientation of the slide corresponds, on a track corresponding to the total travel, to the position of the window at any point in the possible travel. This potentiometer is connected for example to a toothed sector of a crossed-arm mechanism of known type or to any other window raising means effecting a movement of rotation compatible with the angle of operation of the potentiometer. The connection between the detector 4 and the motor 3 is diagrammatically represented by the dot-dash line 5.

The device further comprises a window position selector 6, a description of which will be given hereinafter with reference to FIGS. 3 to 5. It suffices to note here that this selector comprises a main potentiometer having a rectilinear displacement the total travel of which represents the movement of the window between its two end stop points $P_1$ and $P_2$ (upper and lower).

As soon as the user manifests an intention to effect any displacement of the window relative to any position of rest, the selector produces a signal $S_2$ which, with the signal $S_1$ corresponding to the real position, is applied to a comparator 7 which delivers a signal expressing the desired direction of displacement and consequently the energy level to be delivered by the supply source 1, 2.

The output signal of the comparator 7 is applied through a path a to the source 1 and through a path b to a circuit 8 which determines the direction of displacement and is connected in the power line delivered by the power circuit 2.

The circuit 8 recognizes from the signal received through the path b the desired direction of displacement and delivers to the motor 3 a current of given direction corresponding to the desired direction of rotation of this motor and consequently to the direction of displacement of the window.

In parallel with the comparator 7, two comparators 9 and 10 deliver to the supply source 1, 2 a signal which may be possibly amplified by an amplifier 11.

The signal delivered by the comparators 9 and 10 is substantially proportional to the difference between the signals $S_1$ and $S_2$.

As there is only one source of dc current for measuring a difference which may be positive or negative between the signals $S_1$ and $S_2$, two comparators are required, namely the comparators 9 and 10 each of which delivers a characteristic signal related to the direction.

In accordance with the type of signal emitted by the comparator 9 or 10, the supply source 1 delivers the energy level required by the desired direction of displacement as long as a difference is detected between the signals $S_1$ and $S_2$ and prevents the power circuit 2 from supplying energy to the motor 3 as soon as this difference is null or substantially null, and consequently as soon as there is coincidence between the position of the window and the intention manifested by the user to within large tolerances in the control.

According to a particular feature of the circuit, the gain $g_1$ of the comparator 7 is higher than the gain $g_2$ of the comparators 9 and 10 so that the circuit 8 is informed through the path b of the desired direction before the supply source 1, 2 delivers a corresponding energy level to the motor 3.

The circuit is so designed that the action exerted by the user on the selector results in a movement of the window within a time which is proportional (according to the energy level) to the magnitude of the difference between the signals $S_1$ and $S_2$ measured by the comparators 9 and 10.

In order to stop the window at the end of the upward or downward travel, it is illusory to count on the precise angular setting of the potentiometer of the position detector 4, relative to the completely open or completely closed positions, owing to the mechanical tolerances and variable clearances both in the control mechanism and in the body of the vehicle, which results in differences which may appear both upon assembly and after a certain period of operation.

In order to accept all these differences and to avoid any adjustment and trial upon assembly on the vehicle production line (and consequently in order to assemble the window raisers at minimum cost), an end-of-travel stop device remedies all the inaccuracies by also avoiding the maintenance operations for the purpose of adjusting the end positions during the life of the vehicle.

For this purpose, the angular length of the track of the potentiometer of the position detector 4 is chosen to be a little larger than necessary so that, irrespective of assembly differences, the slide, when it is located in the positions respectively corresponding to the upper and lower positions of the window, never reaches the end of the track of the potentiometer. In these positions of the slide, the potentiometer produces two particular values of the signal $S_1$ and these values are applied to an end-of-travel responsive circuit 12 which receives from an end-of-travel stop circuit 13 a signal as soon as the latter circuit detects a blocking by the observation of the intensity of the current absorbed by the motor 3. Upon blocking, this intensity suddenly rises in the motor 3.

The circuit 13 is designed for a value of intensity capable of ensuring a good sealed closure of the window in the upper position and a mechanical stress which the window raising mechanism can stand in the lower position of the window.

When the signals delivered by the detector 4 and the stop circuit 13 indicate that an end position has been reached, the circuit 12 stops the chopper 1 by way of a path f and consequently cuts off the supply of the motor 3 and puts the power circuit 2 in the state of rest, this power circuit being once again supplied with current only when the signal $S_1$ differs from the signal $S_2$ in the direction opposed to the previous direction.

It is usual to air, de-mist, cool, ventilate, etc. the vehicle when the vehicle is travelling or stationary, by partly opening one or more windows. In conventional electrical window raisers, such an opening is difficult to regulate finely and several attempts are often necessary owing to the speed of displacement imposed on the window.

The device according to the invention permits obtaining a pre-selected ventilation position $P_3$, for example embodied on the window position selector 6 by a mechanical hard point resulting in a permanent special contact or by a depressible button which is maintained mechanically or any other bistable device which is capable of applying to the comparator 7 a signal corresponding to the position $P_3$. In the embodiment described with reference to FIGS. 3 to 5, it is the first solution which has been chosen. Further, in order to simplify the circuits, the position $P_3$ is only obtained in the direction of the descent of the window and thereby offers the sole possibility of changing from the closed position to the ventilating position, but it will be understood that the device may be adapted to act in starting from the open position of the window.

The signal delivered by the selector 6 applies the ventilating signal to the comparator 7 so as to impose by way of the path b the direction of displacement on the motor 3.

This signal also controls, by way of the path d, a delay circuit 14 which confirms the output signal of the comparator 7 and imposes on the chopper 1 the corresponding energy level.

The time $t_1$, determining the duration of the action of the delay circuit 14, may be such that, bearing in mind the constant speed imposed on the window, the opening is sufficient for a ventilation without however aiming at a strict precision (1 to 2.5 cm for example).

A centralized ventilating control 15 may be provided and this also will only have effect in starting at the closed position of all the windows. This control will apply, after a single actuation on the part of the driver, to all the window raisers of the vehicle, a signal equivalent to the ventilation signal defined hereinbefore, by way of all the paths d of the control circuits associated with the corresponding window raisers.

In normal use, an accidental mechanical blocking or wedging of the window may occur in the course of its travel.

It can be presumed that in the case of the descent of the window, it is easy to produce movements which will enable the hard point to be passed through by means of the selector 6.

However, the closure of the windows may be considered to be of prior importance since it ensures the sealing and inviolability of the vehicle.

A circuit 16 detects, upon the rising of the window, any abnormal increase in the intensity of the current in the motor 3. As soon as this intensity exceeds a pre-set level, a trigger circuit 17 triggers a delay circuit 18 which sends, for a rather short period of time $t_2$, the descent command both to the direction determining circuit 8 and to the chopper 1 so as to determine the energy level.

By way of a modification and in order to accelerate the phenomenon, it is possible not to act on the chopper 1 and to cause, for a period of time $t_3$ still shorter than the time $t_1$, the descent of the window at a speed higher than the predetermined speed, by conserving a full power supply for the motor 3 which is the energy level identical to that required for raising the window.

At the end of the delay $t_2$ or $t_3$, the window is raised.

By means of a suitable adjustment of the end-of-travel stop circuit 13, it is possible to adapt its allowable maximum intensity level to a maximum force exerted by the window which is supportable by any part of the human body which might be wedged between the window and the fixed part so as to limit, or avoid risk of, serious injury. Thus, the existence of the circuit of the detector 16 may be benefitted from in order to guarantee the safety of operation of the device according to the invention.

The action of the intensity detecting circuit 16 is of course stopped at the end of the travel by the action of the end-of-travel recognizing circuit 12, so that the safety reversal of movement does not occur from the reception of a signal recognized by the circuit 12 for the upper position corresponding to the entrance of the window in the sealing element of the door for example.

When the user leaves the vehicle, most modern equipments enable him to effect a centralized locking so that, by means of a single action on for example one latch, all the exits of the vehicle are closed.

The closing or locking signal produced in a central control device 19 may be injected through a path e into each window control unit in an OR gate 20 which applies to the comparator 7 an artificial difference between the signals $S_1$ and $S_2$ so that the closure of all the windows is imposed, this action being stopped at the end of the travel by the circuits 12 and 13.

A processing of the information by a single centralized control unit 15 may also permit leaving the vehicle with all the windows moving to the "ventilation" position by applying to each control unit, through its path d, the aforementioned centralized ventilating order and resulting from the closure of the exits, it being understood that the centralized ventilation position control has been initiated.

The mechanical irreversibility of the motor-speed reducer units usually employed in window raisers for the drive (motor 3) completely prevents the opening of the window by any effort which may be exerted thereon, unless a partial opening of the window allows the introduction of objects or devices which enable the unlocking of the doors to be achieved.

In order to avoid inability to close the exits of the vehicle in the case of assault and in the possible particular case where a thrust exerted on the window causes the circuits 16, 17 and 18 to operate and result in a reversal of the movement, and the prohibition of the urgent closure, an obligatory locking device may be provided in the device according to the invention.

For this purpose, there may be provided, as described hereinafter, a special contact 21 in the selector 6 which, at the end of the upward travel of the main potentiometer of this selector 6, must be actuated so as to put the intensity detection circuit 16 out of action and avoid the reversal of operation. This contact may be of the type having a fleeting action or having two stable positions, and it may possibly be connected in such manner as to put the intensity detection circuits of the control devices of all the electric window raisers of the vehicle out of action. The contact in question conveys a signal by way of the paths g and h so as to respectively ensure the displacement of the window in the suitable direction and prohibit the automatic return of the window. Further, the contact 21 overrides the signal produced by the main potentiometer of the selector 6.

The contact 21, in the case of a hard point of resistance when the window rises and in order to ensure a priority closure of the latter, also permits the exertion of a continuous action when the window rises without having the reversal produced by the anti-blocking device described hereinbefore (delay circuit 18).

The control device may have a water detector 22 and a fire detector 23 placed in a given region of the vehicle so as to store a signal which is put into form as soon as the corresponding incident is detected.

This signal is applied to the supply source 1 and to the circuit 8 determining the direction of displacement so as to cause the complete descent of the window, which descent is stopped by the combined action of the end-of-travel recognizing circuit 12 and the end-of-travel stop circuit 13.

Figure 2:
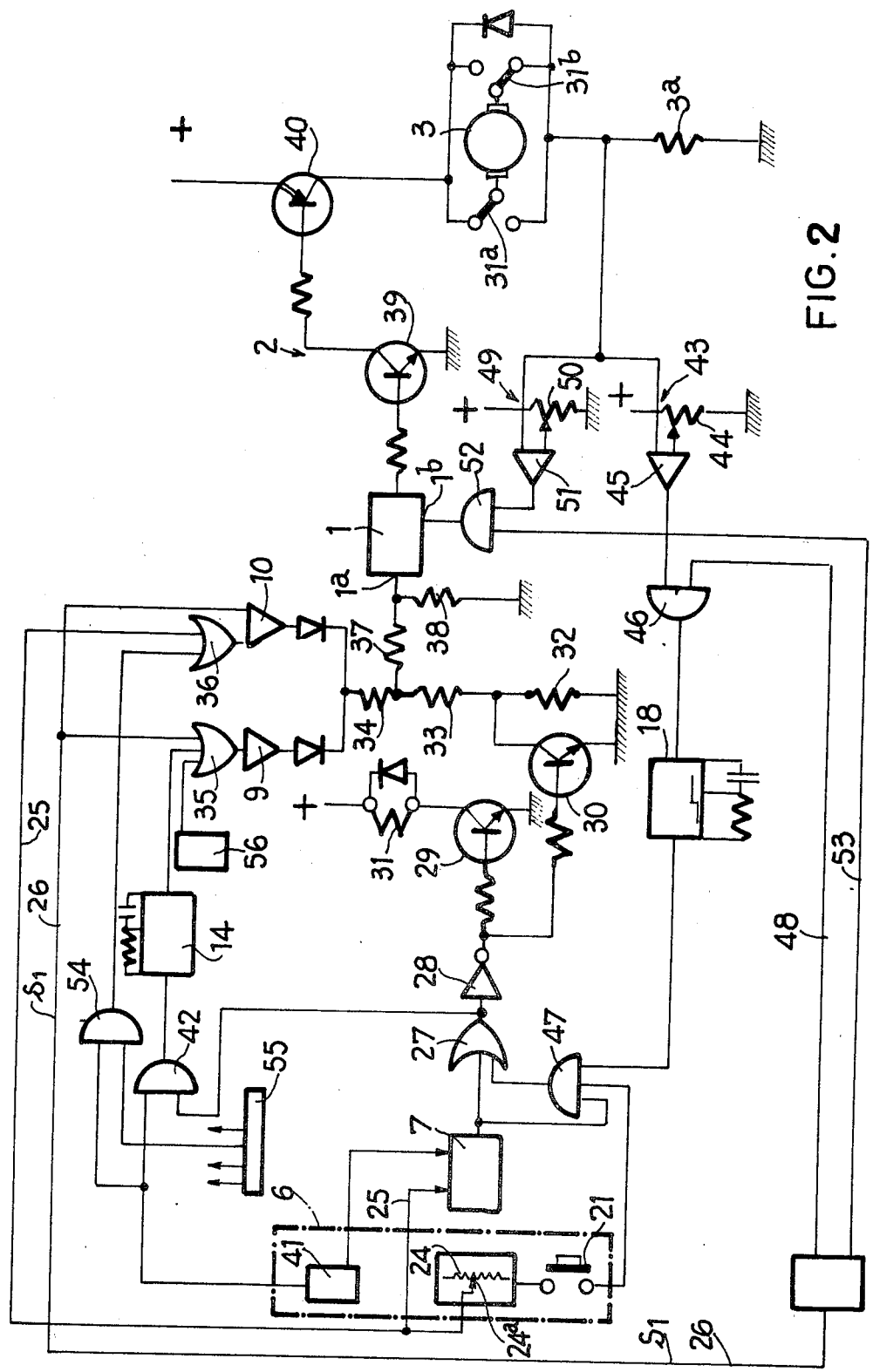
FIG. 2 shows a more detailed electric diagram of the circuit for carrying out the functions diagrammatically represented in FIG. 1.

With reference to FIG. 2, there will now be described a more detailed diagram of the window raising control device. Note that this more detailed diagram differs slightly from the diagram of FIG. 1 but that all the functions described hereinbefore can be performed by means of this diagram.

As mentioned before, the selector 6 comprises a main potentiometer 24 whose slide 24a produces a variable dc voltage which represents the signal $S_2$ transmitted through a line 25 to the comparator 7. The position detector 4 produces a variable dc voltage which forms the signal $S_1$ constituting the real position parameter of the window. The signal $S_1$ is transmitted through a line 26. The output of the comparator 7 produces an error signal coming from the signals $S_1$ and $S_2$, which is applied to an OR gate 27 whose output is connected to an amplifier 28. The latter is connected in parallel with the bases of two transistors 29 and 30. The transistor 29 is the component which determines the direction of rotation imposed on the motor 3. A relay coil 31 is connected in the collector-emitter circuit of this transistor 29. It controls two reversing switches 31a and 31b inserted in the supply circuit of the motor 3 and ensuring the reversal of the current in the latter. Thus, according to the polarity of the signal from the comparator 7 (and consequently the direction of the difference between the signals $S_1$ and $S_2$), the transistor 28 is rendered conductive or blocked and correspondingly controls the direction of rotation of the motor 3.

The output of the amplifier 28 is also connected to the transistor 30 whose collector-emitter circuit is connected in parallel with a resistor 32. The latter is part of a voltage divider which also has resistors 33 and 34.

The lines 25 and 26 are respectively connected to the inputs of OR gates 36 and 35 whose outputs are connected to the comparators 9 and 10. The latter are operational amplifiers whose state changes as a function of the difference between the signals $S_1$ and $S_2$ (rise or descent of the window) so as to apply to the voltage divider 32 to 34 the supply voltage of the control device for example 12 V).

The junction point of the resistors 33 and 34 is connected through a resistor 37 to the control input 1a of the chopper 1, this input being moreover connected to ground through a resistor 38. The chopper 1 is controlled in voltage through the resistors 37 and 38, the resistor 37 limiting the current absorbed by the chopper, whereas the resistor 38 fixes the potential of the input relative to ground and avoids the operation of the chopper in the absence of a signal.

The latter is delivered by one or the other of the comparators 9 and 10. When the window rises, the transistor 30, supplied with current at the same time as the relay 31, is blocked and the chopper 1 is then piloted at its input 1a by a voltage which is determined by the ratio between the resistor 34 and the sum of the resistors 32 and 33, the whole of the divider being supplied with full voltage. Consequently, the maximum power is delivered by the chopper 1 since its duty cycle is maximum (in practice the output signal is a dc voltage in this case).

On the other hand, when the window descends, the transistor 30 is conductive and shorts the resistor 32. The chopper 1 is then piloted by a lower voltage determined by the ratio of the resistors 33 and 34. There results an output signal of the chopper whose duty cycle is lower.

This output signal is applied to the power circuit 2 comprising in this example a Darlington circuit having two transistors 39 and 40. The transistor 40 supplies current to the circuit of the motor 3. Consequently in the course of the descent of the window, the power circuit 2 is rendered active with a low duty cycle and the motor receives minimum power for compensating for the weight of the window.

The selector 6 has an auxiliary potentiometer 41 which, as described hereinafter, is capable of producing a predetermined voltage intended to override the signal $S_2$ so as to reach the ventilation position of the window. This potentiometer is connected, on one hand, to an AND gate 42 and, on the other hand, to the comparator 7. Consequently, when the potentiometer 41 delivers said predetermined voltage, a signal appears at the output of the OR gate 27 indicating the descent command. The gate 42 is then open and its output is connected moreover to the OR gate 35. The delay circuit is capable of actuating the comparator 9 for a given period so that the chopper 1 can receive a piloting signal for a sufficiently long period for driving the motor and the window in the descent direction. The direction of this displacement is determined, as before, through the transistor 29.

The circuit of the motor 3 is connected to ground through a series resistor 3a which is connected to a first motor current detection circuit 43 comprising a regulating potentiometer 44 and a comparator 45. The potentiometer delivers an adjustable reference voltage fixing a current level which, when it is exceeded by the current in the motor 3, changes the state of the comparator 45. It will be understood that the potentiometer 44 may be replaced by a resistor which is adjusted at the required value corresponding to the reference voltage.

The output of the comparator is connected to an AND gate 46 whose output is connected to the delay 18. The output of the latter is connected to an AND gate 47 which, as it is connected to the input of the OR gate 27, can deliver a signal to the control line of the motor 3 instead of the comparator 7. Consequently, if in the course of the rise of the window, an object, for example the arm of the user, is placed in its path and is trapped against the door frame, the increase in the intensity of the currrent in the motor 3 which results immediately changes the state of the comparator 45 which, by way of the AND gate 46, the delay circuit 18 and the AND gate 47, drives the OR gate 27 in the descent direction. The motor is then reversed and operated during a period of time determined by the delay circuit 18.

On the other hand, the increase in the intensity also occurs in the upper position of the window (end of the travel) in which it is obviously essential not to cause the descent of the window. This is why the position detector 4 in the upper position of the window sends to the gate 46 a signal which prohibits the opening of this gate, which is the reason why one of the inputs of the latter is connected to the detector 4 through a line 48.

The same is true in the case of outside danger (assault or other reason) when the user desires to close the windows immediately. Thus, one of the inputs of the AND gate 47 is connected to the switch 21 which is capable of blocking this gate by means of which the control line of the motor 3 is placed in the configuration corresponding to a raising of the window under full power.

The resistor 3a is also connected to a second intensity detection circuit 49 arranged in the same way as the circuit 43 and comprising a regulating potentiometer 50 and a comparator 51, the output of the latter being connected to an AND gate 52. It will be understood that, in the same way as the potentiometer 44, the potentiometer 50 may be replaced by a resistor adjusted at the desired value.

The AND gate 52 may receive through its other input an end-of-travel signal from the position detector 4 through a line 53, this signal corresponding to the upper position or lower position of the window, whereas the output of this AND gate 52 is connected to a blocking input 1b of the chopper 1.

Consequently, when, in the course of normal operation, the window reaches either of its end positions, the increase in the intensity of the current in the motor 3 changes the state of the comparator 51 which opens the gate 52 which also receives this end-of-travel signal from the detector 4. The chopper 1 ceases to operate and the motor 3 then stops.

And AND gate 54 is connected through a first input to the potentiometer 41 and through a second input to a centralized control 55. Its output is connected to an input of an OR gate 36 which ensures the raising of the window, in particular through the comparator 10. Consequently, if a centralized window closing order is applied through the control 55 to the AND gate 54, the OR gate 36 transmits this signal so that the chopper causes the raising of the window. If at the moment of this order the gate 54 also receives the "ventilation" order through the potentiometer 41, the configuration of the circuit is such that the window is placed in the ventilation position.

A water or fire detector 56 is connected to the OR gate 35 so as to transmit an order to the motor 3 for a complete opening of the window down to the lowermost position of the latter.

FIGS. 3 to 5 show a preferred embodiment of the selector 6 comprising the contact 21 and the potentiometers 24 and 41.

Slidably mounted in a rectilinear opening 60 of a support panel 61 is a control knob 62. The panel 61 may be placed for example between the front seats of the vehicle and include the selector 6 of all the window raisers of the vehicle (for example two or four). The panel may be partly covered with a cover plate 63 bearing a graduation and surrounding the opening 60. A mounting block 64 is fixed under the panel 61. It has a longitudinal stepped cavity 64a forming a guide for the lower portion 65 of the knob 62, this lower portion forming a slide.

The knob 62 also has a cavity 66 in which is disposed a transmission means 67 which is slidable in this cavity and is guided in the latter owing to lateral projections 68 received in lateral grooves 69 of the cavity 66. The transmission 67 normally abuts one of the walls of the cavity 66 owing to the effect of a spring 70 interposed between the opposite wall of the cavity 66 and the corresponding end face of the transmission means which, for this purpose, has a perpendicular lug 71 on which the spring 70 is mounted.

The transmission means 67 has an opening 72 of rectangular section extending therethrough, in which opening a connecting bar 73 is inserted, this bar being fixed by an elastically yieldable clipping at 74 in the opening 72. The connecting bar 73 extends downwardly through a longitudinal opening 75 formed in the bottom of a groove provided in the bottom of cavity 64a. It is rigid with two supports 76 and 77 each of which carries two rubbing contacts 78 to 81 which are capable of moving in a second longitudinal cavity 64b formed in the lower part of the mounting block 64. The upper wall of this cavity 64b is coated with a conductive track 82 and a resistive track 83 extending longitudinally and in contact with the rubbing contacts 78 and 79 respectively. Provided on the lower wall of the cavity 64b are also a conductive track 84 and a resistive track 85 in contact with the rubbing contacts 80 and 81.

The tracks 82 and 83 form with the rubbing contacts 78 and 79, electrically interconnected, the potentiometer 24 and the tracks 84 and 85 and the rubbing contacts 80 and 81, also interconnected, constitute the whole of the potentiometer 41.

Two contacts 86 and 87 are mounted in the end wall 88 which closes one of the ends of the groove 64a of the mounting block 64. These contacts 86 and 87 cooperate with a conductive strip 89 which is fixed on the outer facing side of the knob 62. The contacts 86 and 87 and the strip 84 together form the switch 21 (FIG. 2). Formed in the side wall of the groove 64 is a triangular recess 90 which, in cooperation with an elastically yieldable strip 91 of complementary shape and mounted on the knob 62, fixes a given position of the latter. It concerns the ventilation position of the window whereby the potentiometer 41 can send a signal $S_2$ of given value to the comparator 7 (FIG. 2).

Note that in order to close the switch 21 formed by the contacts 87 and 88 and the strip 89, the knob 62 must first be placed in its end position in which the supports 76 and 77 abut the front wall of the cavity 64b. In this position of abutment, the contact 21 is not yet closed. It can only be closed if an additional thrust is exerted on the knob 62 which results in a relative movement between the latter and the transmission means 67 in opposition to the action of the spring 70. This action occurs only in the case of danger, it being necessary for the user to maintain the knob 62 in position until the window is closed.

Having now described my invention what I claim as new and desire to secure by Letters Patent is:

1. A device for controlling window raisers, in particular for an automobile vehicle, comprising, for each window raiser to be controlled, an electric supply source, a control circuit connected to the supply source to control the supply source, an electric driving motor connected to said supply source, a selector connected to the control circuit and for ensuring the selective supply of current to the motor, in one direction or the other, through the control circuit, said supply source being capable of delivering at least two distinct energy levels and comprising for this purpose a control input and said control circuit comprises means for applying to said input an energy level control signal, said control signal producing, as a function of the position of said selector, the application of a torque to the motor when raising the window which is higher than the torque applied when descending the window.

2. A device as claimed in claim 1, wherein said supply source comprises a current chopper having a variable duty cycle and a power circuit connected between the chopper and said motor for delivering to the motor energy with a duty cycle imposed by said current chopper.

3. A device as claimed in claim 2, wherein, when raising the window, said power circuit delivers to the motor a dc voltage, this being commanded by a dc signal from said chopper, whereas when the window is lowered, said chopper imposes on said power circuit a signal having a given duty cycle.

4. A device as claimed in claim 1, wherein said control circuit comprises a regulating loop comprising a window position selector delivering a command signal determining the position that the window must reach, a window position detector delivering a real position signal, a comparator for determining a position error signal, and means for determining the direction of rotation of the motor as a function of the polarity of said error signal, said regulating loop further comprising a generating circuit for producing from the polarity of said error signal said energy level control signal applied to the input of the supply source.

5. A device as claimed in claim 4, wherein said generating circuit comprises a voltage divider to which there is applied a supply voltage as long as an error signal appears in said regulating loop, and a transistor connected in parallel to a part of the divider, an intermediate point of the divider being connected to the input of said supply source whereas said transistor has a base connected to an output of said comparator.

6. A device as claimed in claim 5, comprising two comparators connected in parallel both having two inputs and one output, a first input of both comparators being connected to said selector and a second input of both comparators being connected to said position detector, the outputs of said comparators being connected together to said voltage devider whereby the two comparators selectively apply said supply voltage to the divider as long as there remains an error signal in said regulating loop.

7. A device as claimed in any one of the preceding claims, comprising means for selecting a ventilation position of the window.

8. A device as claimed in claim 6, comprising means for selecting a ventilation position of the window and comprising a ventilation control device incorporated in said selector for producing a window lowering command signal, said ventilation control device being connected to one of said comparators in parallel through a delay circuit.

9. A device as claimed in any one of the claims 4, 5, 6 or 8, wherein said regulating loop further comprises a first circuit for producing a first signal when a predetermined level of intensity of the current in the motor is exceeded and means for applying said first signal to said chopper so as to inhibit said chopper when said position detector reaches respectively positions corresponding to ends-of-travel of the window.

10. A device as claimed in claim 9, comprising an inhibition input for the chopper and an AND gate having an output connected to the inhibition input of the chopper, a resistor which is connected in series in the circuit of said motor and is connected to a first level comparator to which first level comparator there is applied a reference level signal, and said position detector and an output of said first level comparator being connected to inputs of the AND gate.

11. A device as claimed in any one of the claims 4, 5, 6, or 8, wherein said regulating loop further comprises a second circuit for producing a second signal when a second level of the current in said motor is exceeded, and means for temporarily injecting into said loop a command signal corresponding to the lowering of the window.

12. A device as claimed in claim 11, comprising a resistor connected in series in the circuit of said motor, and resistor being connected to a second level comparator to which there is applied a second reference level signal and said second comparator is connected to an output of the comparator of the regulating loop through a delay circuit so as to temporarily inject said lowering command signal into said loop when said second level is exceeded.

13. A device as claimed in claim 11, comprising manually controlled means for inhibiting said means for temporarily injecting into said loop a lowering command signal even when said second predetermined level is exceeded.

14. A device as claimed in claim 6, wherein, in the case of the simultaneous control of a plurality of window raisers, there is provided a centralized control for applying to one of the comparators in parallel of each regulating loop a raising signal so as to cause the simultaneous closing of all the windows.

15. A device as claimed in claim 6, the vehicle equipped with the control device being provided with at least one detector supervising a condition dangerous for the occupants of the vehicle (water, fire or other danger), wherein one of the comparators in parallel of said regulating loop is connected to said supervising detector for achieving the descent of the window when the last-mentioned detector delivers a signal responsive to the presence of a dangerous condition.

16. A device as claimed in claim 4, wherein said regulating loop further comprises a first circuit for producing a first signal when a predetermined level of intensity of the current in the motor is exceeded and means for applying said first signal to said chopper so as to inhibit said chopper when said position detector reaches respectively positions corresponding to ends-of-travel of the window, said device further comprising means for selecting a ventilation position of the window, a second circuit in said regulating loop for producing a second signal when a second level of the current in the motor is exceeded, and means for temporarily injecting into said loop a command signal corresponding to a lowering of the window, manually controlled means for inhibiting said means for temporarily injecting into said loop a lowering command signal even when said second predetermined level is exceeded, said selector comprising a first potentiometer for delivering said command signal, a second potentiometer connected to the first potentiometer for producing a command signal corresponding to said ventilation position, and a switch for producing said signal inhibiting the means for temporarily injecting a descent command signal in said loop, said switch being adapted to be actuated beyond the end-of-travel of said first potentiometer corresponding to the full closure of the window.

17. A device as claimed in claim 16, wherein said potentiometers are connected to a common slidable control means combined with a guideway which comprises a point of harder resistance to the passage of the slidable control means, said second potentiometer in said control means producing a descent command signal so that the window reaches the ventilation position thereof.

18. A device as claimed in any one of claims 4-6 further comprising means for selecting a ventilation position of the window, wherein said regulating loop further comprises a first circuit for producing a first signal when a predetermined level of intensity of the current in the motor is exceeded and means for applying said first signal to said chopper so as to inhibit said chopper when said position detector reaches respectively positions corresponding to ends-of-travel of the window.

19. A device as claimed in claim 18, comprising an inhibition input for the chopper and an AND gate having an output connected to the inhibition input of the chopper, a resistor which is connected in series in the circuit of said motor and is connected to a first level comparator to which first level comparator there is applied a reference level signal, and said position detector and an output of said first level comparator being connected to inputs of the AND gate.

20. A device as claimed in any one of claims 4–6 further comprising means for selecting a ventilation position of the window, wherein said regulating loop further comprises a first circuit for producing a first signal when a predetermined level of intensity of the current in the motor is exceeded and means for applying said first signal to said chopper so as to inhibit said chopper when said position detector reaches respectively positions corresponding to ends-of-travel of the window, a second circuit for producing a second signal when a second level of the current in said motor is exceeded, and means for temporarily injecting into said loop a command signal corresponding to the lowering of the window.

21. A device as claimed in claim 20, comprising a resistor connected in series in the circuit of said motor, said resistor being connected to a second comparator to which there is applied a reference level signal and said second comparator is connected to an output of the comparator of the regulating loop through a delay circuit so as to temporarily inject said descent command signal into said loop when said second level is exceeded.

22. A device as claimed in claim 20, comprising manually controlled means for inhibiting said means for temporarily injecting into said loop a lowering command signal even when said second predetermined level is exceeded.

* * * * *